United States Patent
Schmidt et al.

(10) Patent No.: US 7,578,902 B2
(45) Date of Patent: Aug. 25, 2009

(54) APPARATUS AND METHOD FOR MANUFACTURING A MULTI-LAYER WEB PRODUCT

(75) Inventors: Bradley G. Schmidt, Green Bay, WI (US); Edward J. Yock, Appleton, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 0 days.

(21) Appl. No.: 12/176,339

(22) Filed: Jul. 19, 2008

(65) Prior Publication Data

US 2008/0280520 A1 Nov. 13, 2008

Related U.S. Application Data

(62) Division of application No. 10/984,085, filed on Nov. 8, 2004, now Pat. No. 7,416,638.

(60) Provisional application No. 60/523,362, filed on Nov. 18, 2003.

(51) Int. Cl.
*D21F 11/00* (2006.01)

(52) U.S. Cl. .................. 162/141; 162/289; 162/215; 19/98; 19/100; 19/65; 442/384; 442/381; 428/108; 428/152

(58) Field of Classification Search ............... 162/141, 162/289, 360.2; 19/215, 98, 100, 65; 442/384, 442/381; 428/284, 108
See application file for complete search history.

(56) References Cited

U.S. PATENT DOCUMENTS

| | | | |
|---|---|---|---|
| 3,486,168 A | 12/1969 | Evans et al. | |
| 3,494,821 A | 2/1970 | Evans | |
| 3,867,741 A | 2/1975 | Frolov et al. | |
| 4,547,936 A | 10/1985 | Bacchio | |

(Continued)

FOREIGN PATENT DOCUMENTS

CA 2240945 12/1996

(Continued)

OTHER PUBLICATIONS

International Search Report and Written Opinion of the International Searching Authority that issued May 18, 2005 in connection with PCT/US2004/038567 (which claims priority to U.S. Appl. No. 10/984,085 and U.S. Appl. No. 60/523,362).

*Primary Examiner*—Mark Halpern
(74) *Attorney, Agent, or Firm*—Joel Charlton (57) ABSTRACT

An apparatus and method for manufacturing a multi-layer web product. A long fiber stream is directed around a rotating carding cylinder. Two combing cylinders are disposed adjacent the carding cylinder to comb a first web of long fiber and a second web of long fiber, respectively, from the carding cylinder. A first conveyor receives the first web from the first combing cylinder and transports the first web toward a layering point. Similarly, a second conveyor receives the second web from the second combing cylinder and transports the second web toward the layering point. A short fiber deposition unit is disposed adjacent the second conveyor and deposits short fibers onto the second web. At the layering point, the first conveyor deposits the first web onto the second web, with the short fibers sandwiched therebetween, to form a layered web product.

13 Claims, 6 Drawing Sheets

U.S. PATENT DOCUMENTS

| | | | |
|---|---|---|---|
| 4,716,628 A | 1/1988 | Bacchio | |
| 4,775,579 A | 10/1988 | Hagy et al. | |
| 4,808,467 A | 2/1989 | Suskind et al. | |
| 4,817,246 A | 4/1989 | Bacchio | |
| 4,879,170 A | 11/1989 | Radwanski et al. | |
| 4,883,709 A | 11/1989 | Nozaki et al. | |
| 4,902,564 A | 2/1990 | Israel et al. | |
| 4,931,355 A | 6/1990 | Radwanski et al. | |
| 5,026,587 A | 6/1991 | Austin et al. | |
| 5,106,457 A | 4/1992 | Manning | |
| 5,151,320 A | 9/1992 | Homonoff et al. | |
| 5,226,214 A | 7/1993 | Napolitano | |
| 5,246,772 A | 9/1993 | Manning | |
| 5,284,703 A | 2/1994 | Everhart et al. | |
| 5,334,446 A | 8/1994 | Quantrille et al. | |
| 5,393,599 A | 2/1995 | Quantrille et al. | |
| 5,413,849 A | 5/1995 | Austin et al. | |
| 5,431,991 A | 7/1995 | Quantrille et al. | |
| 5,475,903 A | 12/1995 | Collins | |
| 5,573,841 A | 11/1996 | Adam et al. | |
| 5,587,225 A | 12/1996 | Griesbach et al. | |
| 5,623,748 A | 4/1997 | Bacchio | |
| 5,789,328 A | 8/1998 | Kurihara et al. | |
| 6,022,447 A | 2/2000 | Radwanski et al. | |
| 6,028,018 A | 2/2000 | Admundson et al. | |
| 6,037,282 A | 3/2000 | Milding et al. | |
| 6,063,717 A | 5/2000 | Ishiyama et al. | |
| 6,110,848 A | 8/2000 | Bouchette | |
| 6,381,817 B1 | 5/2002 | Moody, III | |
| 2003/0101556 A1 | 6/2003 | Fleissner | |
| 2003/0124938 A1 | 7/2003 | Zafiroglu et al. | |
| 2003/0124939 A1 | 7/2003 | Zafiroglu et al. | |

FOREIGN PATENT DOCUMENTS

| | | |
|---|---|---|
| DE | 10001957 A1 | 1/2000 |
| EP | 0963745 A1 | 12/1999 |
| EP | 1046731 A1 | 10/2000 |
| WO | 9315247 A1 | 8/1993 |
| WO | 0063478 A1 | 10/2000 |

APPARATUS AND METHOD FOR MANUFACTURING A MULTI-LAYER WEB PRODUCT

CROSS REFERENCE TO RELATED APPLICATIONS

This application is a division of U.S. application Ser. No. 10,984,085, now U.S. Pat. No. 7,416,638, filed Nov. 8, 2004, which claims the benefit of U.S. Provisional Application Ser. No. 60/523,362, filed on Nov. 18, 2003. The priorities of the foregoing applications are hereby claimed and the entirety of their disclosures incorporated herein by reference.

FIELD OF THE INVENTION

The field of the present invention is the manufacture of multi-layer web products, particularly web products made from nonwoven fibers.

BACKGROUND

Consumers tend to prefer nonwoven web products made from long fibers because of their superior hand feel as compared to short fibers such as wood pulp. Unfortunately, long fiber web products are generally more expensive than short fiber web products. Therefore, in order to meet the demands of consumers by providing a web product having a superior hand feel and meet the needs of manufacturers by reducing costs of materials and production, web products that include a combination of long and short fibers have been developed.

Figure 1:
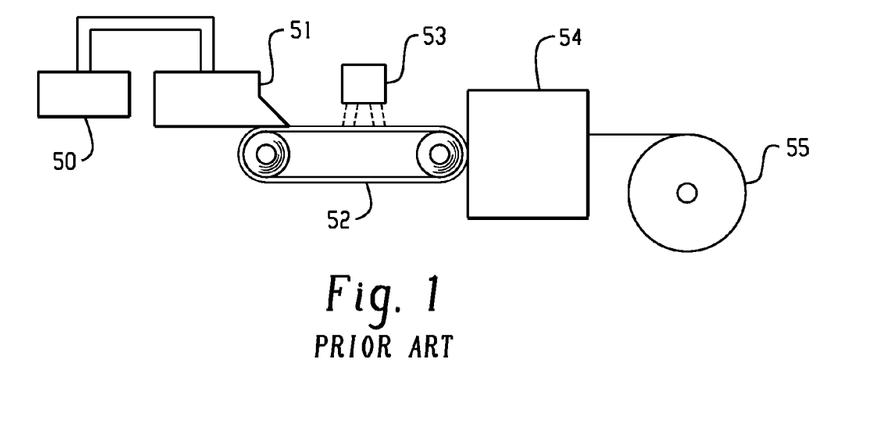
FIG. 1 schematically illustrates an apparatus and method for manufacturing wet laid hydroentangled web products in accordance with the prior art.

FIG. 1 schematically illustrates a prior art apparatus for manufacturing wet laid fibrous web products using in-line hydroentanglement. The fibers are opened, treated, blended, diluted, and refined as necessary at the pre-treatment stage 50 of the apparatus to form the furnish. To provide a product having a hand feel that is superior to short fiber products, the furnish is formed from a combination of short and long fibers mixed together (throughout this description of the background and the description of the preferred embodiment of the invention, short fibers are typically natural fibers, but may also be or include synthetic fibers, while long fibers are typically synthetic fibers, but may also be or include natural fibers). From the pre-treatment stage 50, the furnish is directed into the head box 51, from which the fibers are deposited as a web onto the forming wire 52. Once on the forming wire 52, the web is conveyed to the hydroentanglement unit 53, which directs high pressure water streams at the web to entangle the fibers. Depending upon the final web properties desired, the web may be transported under the hydroentanglement unit multiple times or under a hydroentanglement unit with multiple hydroentangling heads, or the web may be turned over to direct the high pressure water at the other side of the web. Following hydroentanglement, a drying unit 54 dries the web using any number of conventional drying processes, such as steam heated can dryers, TAD (through air drying), or Radiant Heat (such as Infra-Red). After drying, the web is wound into a roll 55 for storage or subsequent processing.

The combination web products produced using the apparatus of FIG. 1 exhibit cost savings over all long fiber products. At the same time, such products come closer to providing, but do not reach, the superior hand feel associated with all long fiber products.

Figure 2:
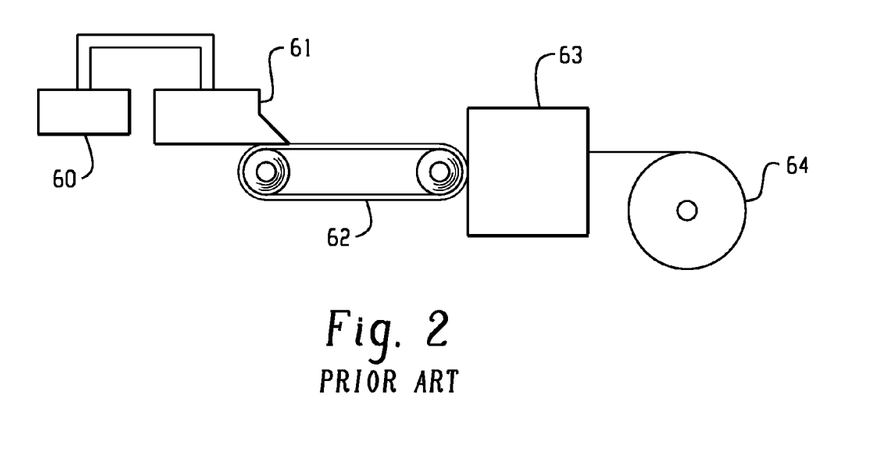
FIG. 2 schematically illustrates an apparatus and method for manufacturing wet laid web products in accordance with the prior art.
Figure 3:
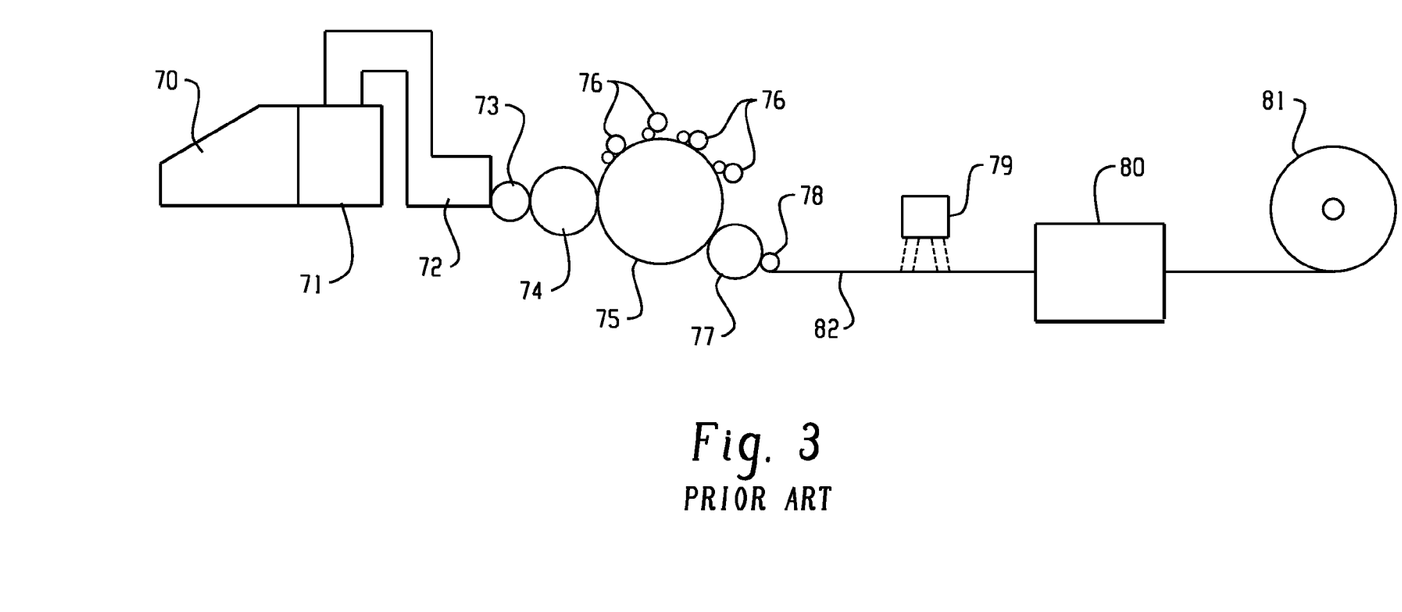
FIG. 3 schematically illustrates an apparatus and method for manufacturing dry-laid web products in accordance with the prior art.
Figure 4:
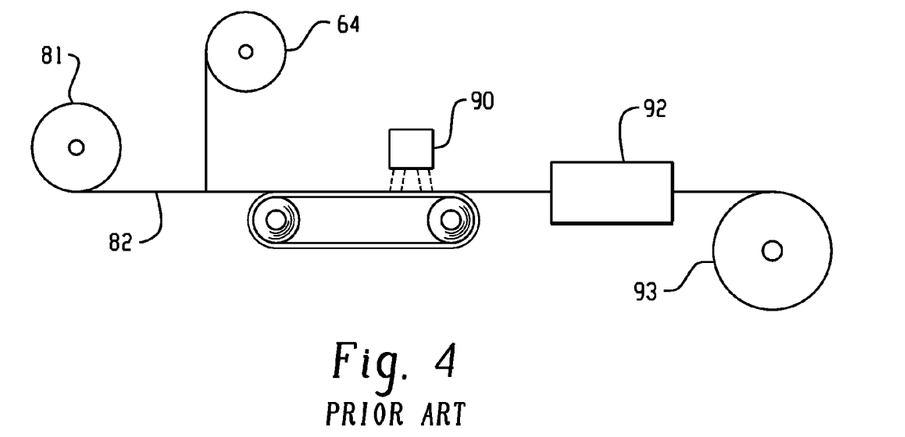
FIG. 4 schematically illustrates an off-line apparatus and method for manufacturing two-layer web products in accordance with the prior art.

Two-layer web products have also been developed. Such web products have a first layer of short fibers and a second layer of long fibers. FIGS. 2-4 schematically illustrate prior art apparatuses for manufacturing two-layer web products. The apparatus of FIG. 2 is employed to manufacture a single layer wet laid short fiber web product. Such a short fiber web product is used as the first layer of a two-layer web product in a downstream process. In brief, the short fibers are separated, treated, blended, diluted and refined as necessary at the pre-treatment stage 60 of the apparatus to form the furnish. From the pre-treatment stage 60, the furnish is directed into the head box 61, from which the fibers are deposited onto the forming wire 62. A drying unit 63 dries the web and the dried web is wound into a roll 64 pending subsequent processing.

The apparatus of FIG. 3 is employed to manufacture a single layer long fiber web product. Such a long fiber product is used as the second layer of a two-layer web product in a downstream process. The web formed with this apparatus typically uses longer fibers (generally 25 to 45 mm, or longer such as 45 to 100 mm). The long fibers are pre-opened in the bale opener 70 and transported to the fine opener 71. Once the fibers are sufficiently separated and declumped for final processing and forming, they are transported to the chute feed 72 which meters them at a uniform rate and volume onto the feed roll 73 and then the lickerin roll 74. The lickerin roll 74 transfers fibers in a separated, uniform, and controlled manner to the main carding cylinder 75. The fibers are repeatedly combed and stripped from the main carding cylinder 75 by the worker and stripper rolls 76. A combing cylinder 77 is positioned to comb the web from the main carding cylinder 75 and transfer the web to the doffer cylinder 78 (which also serves to comb the web). The web is transferred from the doffer cylinder 78 onto the forming wire 82. Once on the forming wire 82, the web is passed under a hydroentanglement unit 79 and through the drying unit 80. The dried web is wound into a roll 81 pending subsequent processing.

The long fiber web product created by the process of FIG. 3 may be substituted with a two-layer long fiber web product through implementation of the carding apparatus disclosed in European Patent Application EP 1046731 A1, the disclosure of which is incorporated herein by reference. With such a carding apparatus, two webs are combed from the main carding cylinder, recombined, and joined either through entanglement or light adhesive bonding. Subsequent processing of both one- and two-layer long fiber webs may be performed in the same manner.

The apparatus of FIG. 4 is employed to combine a short fiber web with a long fiber web into a two-layer web product. A long fiber web, such as one made by the apparatus of FIG. 3, is unwound from a roll 81 onto a carrier wire 82. A short fiber web, such as one made by the apparatus of FIG. 2, is unwound from a roll 64 and laid upon the long fiber web. The two webs are passed under a hydroentanglement unit 90, through a dryer unit 92, and wound into a roll 93.

The two-layer web products produced using the apparatuses of FIGS. 2-4 also exhibit cost savings over all long fiber products. However, because only one side of such web products exhibits the superior hand feel of long fibers, while the other side exhibits the less desired hand feel of short fibers, such a product does not meet with the same consumer demand as does an all long fiber web product.

FIGS. 2-4 illustrate an off-line process of manufacturing the two-layer web product. In practice, however, the apparatuses of FIGS. 2-4 are combinable for in-line formation of the two-layer web product.

Figure 5:
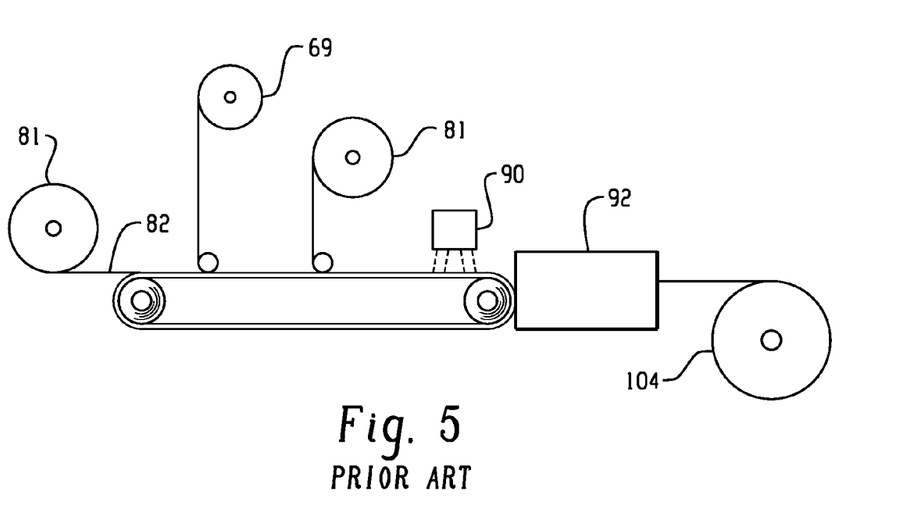
FIG. 5 schematically illustrates an off-line apparatus and method for manufacturing three-layer web products in accordance with the prior art.

U.S. Pat. No. 6,110,848, the disclosure of which is incorporated herein by reference, teaches a three-layer web product and the production thereof. This three-layer web product goes further toward meeting the demands of consumers and the cost needs of manufacturers, as it includes two outer layers of long fiber and a middle layer sandwiched therebetween of short fiber. The apparatus of FIG. 5 is employed to manufacture such a three-layer web product. A first long fiber web is unwound from a roll 81 onto a carrier wire 82. A short fiber web is unwound from a second roll 69 and laid upon of the first long fiber web. A second long fiber web is unwound from a roll 81 and laid upon the short fiber web, thereby sandwiching the short fiber web between two layers of long fiber. This three-layer structure conveyed under a hydroentanglement unit 90 and through a drying unit 92. As with other prior art, hydroentanglement of the three-layer web may be done with multiple passes, multiple heads, or on both sides of the web. The dried web is wound into a roll 104 pending further processing.

The three-layer web product is superior to other prior art web products that combine long and short fibers because it has the superior hand feel on both sides of the product and the product may be bulked up with short fiber as the middle layer without effecting the hand feel on either side of the product.

Figure 6:
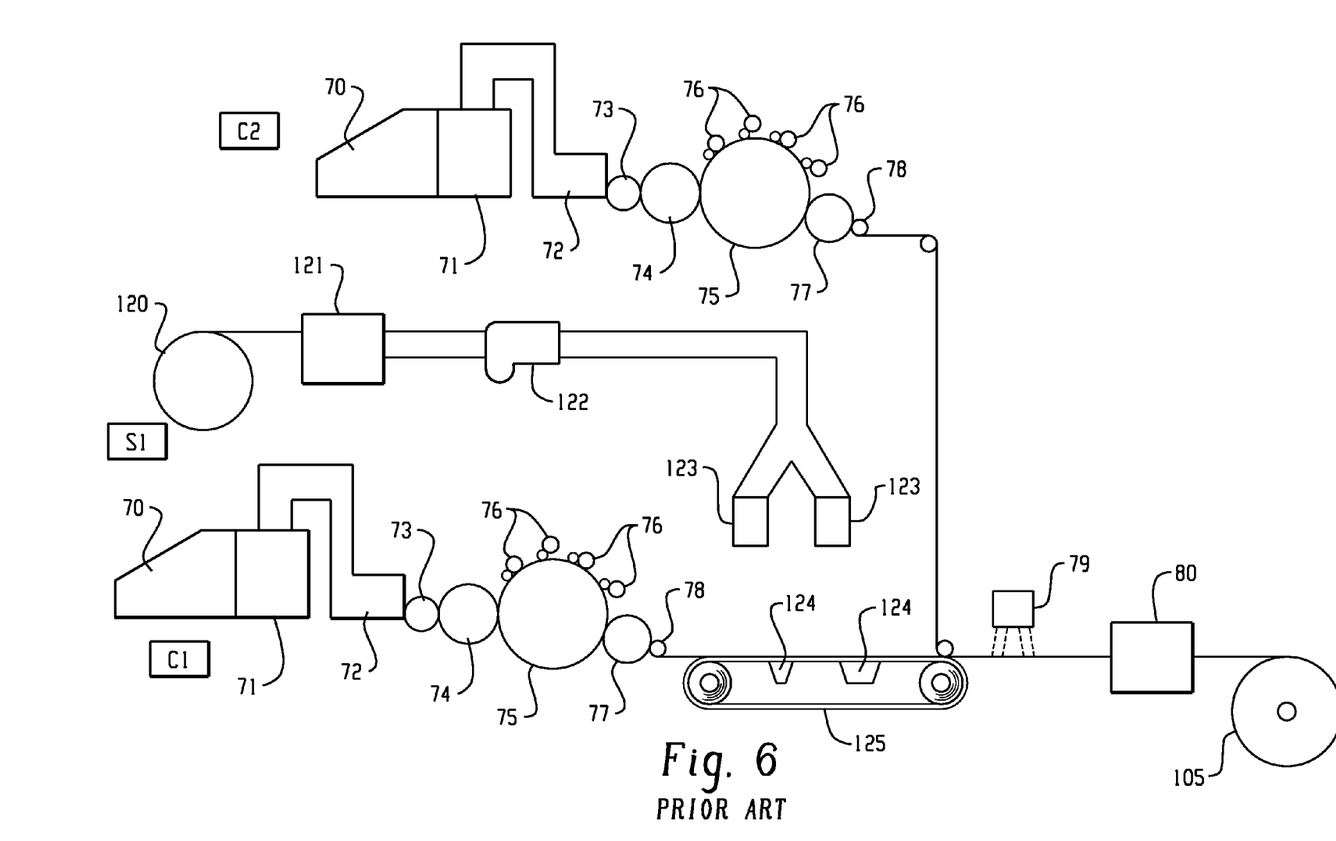
FIG. 6 schematically illustrates an in-line apparatus and method for manufacturing three-layer web products in accordance with the prior art.

The apparatus of FIG. 6 illustrates the process of FIG. 5 as an in-line process. The long fiber forming equipment, labeled as C1 and C2, respectively, up to the doffer cylinder 78, is the same as described in connection with FIG. 3. A first long fiber web from the first forming equipment C1 is laid upon the forming wire 125. Short fiber deposition equipment S1 deposits short fiber upon the first long fiber web. The short fiber, whether from a roll or otherwise, is fed into a hammermill 121 which separates the fibers. A transport fan 122 sends the separated short fibers to the forming heads 123, where the short fibers are blown onto the first long fiber web. Vacuum suction units 124 on the opposite side of the forming wire 125 from the forming heads 123 assist in forming the layer of short fibers on the first long fiber web. The second long fiber web from the second forming equipment C2 is laid on top of the short fibers. The three-layer structure is passed under the hydroentanglement unit 79, through the drying unit 80, and wound into a roll 105 pending subsequent processing.

Such an in-line process has the additional cost benefit of reducing or eliminating the need to store intermediary rolls. However, even with these advances in the production of nonwoven web products where 1) the products better meet the demands of consumers and 2) the manufacturing costs have been reduced, the costs of producing such web products remains high and would significantly benefit from apparatuses and processes which serve to further reduce production costs.

SUMMARY OF THE INVENTION

The present invention is directed towards an apparatus and method for manufacturing a multi-layer web product. A carding cylinder is rotated to transport long fiber. Two combing cylinders comb the long fiber from the carding cylinder to form first and second webs of long fiber. Both webs are deposited upon conveyors and conveyed toward a layering point. A short fiber deposition unit is disposed adjacent the conveyor carrying the second web and deposits short fiber upon the second web. The conveyor carrying the first web deposits the first web upon the second web at the layering point, thereby creating a layered web having outside layers formed of long fiber and an inner layer formed of short fiber. The layered web may thereafter be subjected to entanglement to better bind the layers together.

Accordingly, the present invention provides an improved apparatus and method for manufacturing a multi-layer web product. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENTS

Figure 7:
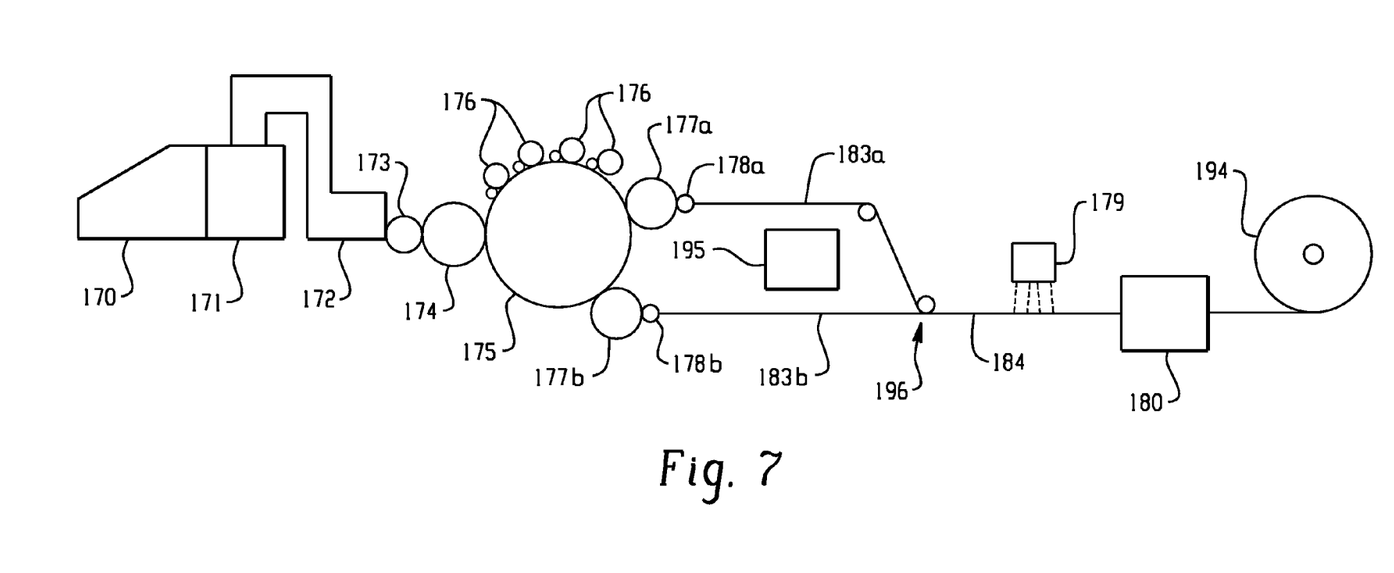
FIG. 7 schematically illustrates an apparatus and method for manufacturing multi-layer web products in accordance with an embodiment of the present invention.

Turning in detail to the drawings, FIGS. 1-6 illustrate the state of the prior art as previously described. In FIG. 7, long fibers are pre-opened in the bale opener 170 and transported to the fine opener 171. Once the fibers are sufficiently separated and declumped for final processing and forming, they are transported to the chute feed 172 which meters them at a uniform rate and volume onto the feed roll 173 and then the lickerin roll 174. The lickerin roll 174 transfers fibers in a separated, uniform, and controlled manner to the main carding cylinder 175. The fibers are repeatedly combed and stripped from the main carding cylinder 175 by the worker and stripper rolls 176. The number or worker and stripper rolls may vary as desired.

A first combing cylinder 177a combs a first web from the main carding cylinder 175. The first web is transferred to the first doffer cylinder 178a and from the first doffer cylinder onto the first conveyor 183a. The first conveyor 183a may be of any appropriate design known to those skilled in the art. The first conveyor 183a transports the first web to the layering point 196, which is the point at which the first and second conveyors recombine the respective webs being transported.

At the same time the first web is combed from the main carding cylinder 175, a second combing cylinder 177b combs a second web from the main carding cylinder 175. The second web is transferred to the second doffer cylinder 178b, and from the second doffer cylinder the web is transferred onto the second conveyor 183b. As with the first conveyor 183a, the second conveyor 183b may be of any appropriate design known to those skilled in the art. The second conveyor 183b transports the second web to the layering point 196. While the second web is on the second conveyor 183b, but before the layering point 196, the second web passes by the short fiber deposition unit 195, which deposits short fibers upon the second web. This short fiber deposition unit may be of the design described in connection with FIG. 6, which separates short fibers and uses air to lay the fibers evenly upon the second web, or it may be of any other appropriate design known to those skilled in the art, such as depositing a web of short fiber upon the second web. It is worth noting again that the short fibers may be synthetic, but use of natural fibers as the short fibers generally makes the process more economical. Similarly, the long fibers may be natural, but use of synthetic fibers as the long fibers generally makes the process more economical.

At the layering point, a layered web is formed by depositing the first web upon the second web, the short fibers being sandwiched therebetween. The layered web is received by a third conveyor 184 which passes the layered web under an entanglement unit 179 which directs jets of high pressure water at the web. The entanglement unit may be of any design known to those skilled in the art, such as drum or flatbed hydroentanglers. Thereafter, the web is passed through a drying unit 180 and wound into a roll 194 pending subsequent processing. However, if desired, subsequent processing may be performed in-line, thereby negating the need to wind the layered web into the roll.

Figure 8:
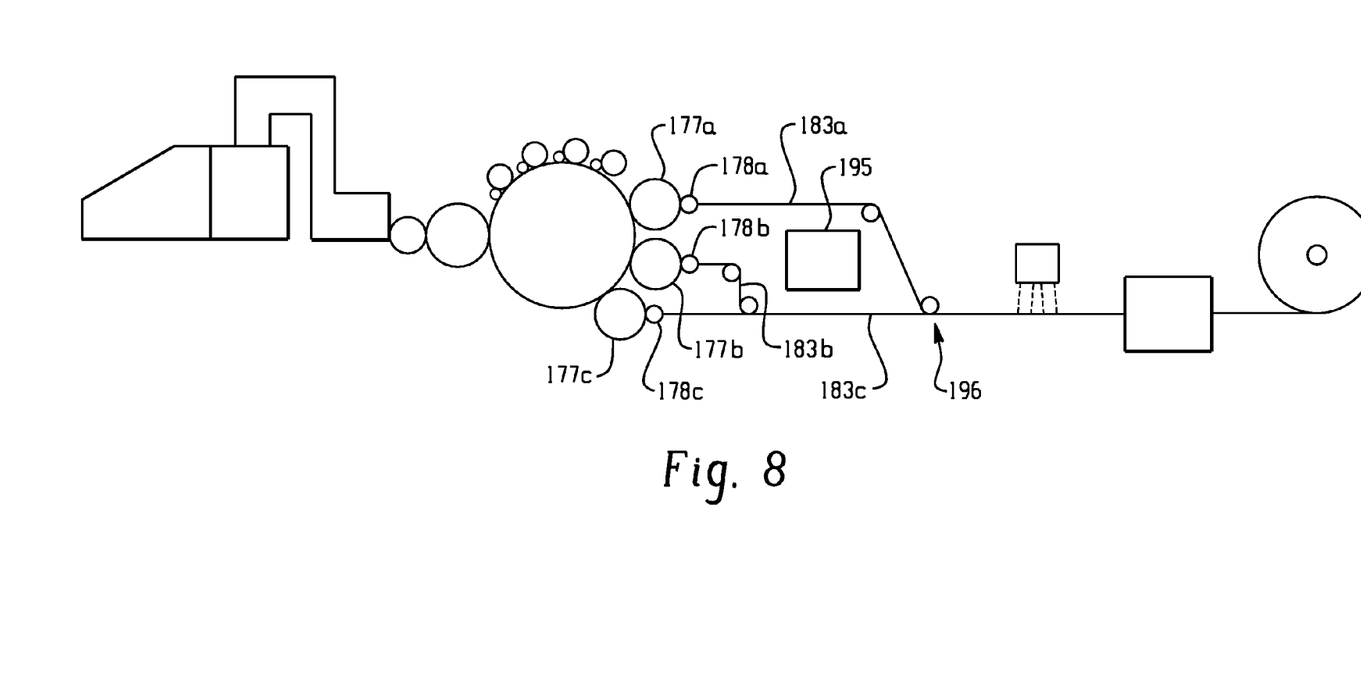
FIG. 8 schematically illustrates an apparatus and method for manufacturing multi-layer web products in accordance with another embodiment of the present invention.

In FIG. 8, three webs are combed from the main carding cylinder. As before, the first combing cylinder 177a combs and transfers the first web to the first conveyor 183a via a first doffer cylinder 178a. The first conveyor 183a transports the first web to the layering point 196. The second combing cylinder 177b combs and transfers the second web onto a second conveyor 183b via a second doffer cylinder 178b, and the third combing cylinder 177c combs and transfers the third web onto the third conveyor 183c via a third doffer cylinder 178c. The second conveyor 183b deposits the second web onto the third web before the third web is transported under the short fiber deposition unit. After the second web is deposited upon the third web, the combined second and third webs pass under the short fiber deposition unit 195, which deposits short fibers upon the combined second and third webs. The first web is thereafter deposited upon the combined second and third webs at the layering point 196, with the short fibers sandwiched therebetween. Hydroentanglement and drying proceed as previously described.

In general, it has been found that when more than one web is combed from the carding cylinder, thinner webs are produced which are more easily manipulated to achieve desired properties of the web. Two generally desired qualities of web products are a low ratio between the machine direction strength and the cross direction strength of the web ("MD:CD ratio") and a consistent basis weight. Older carding apparatuses which combed only one web from the carding cylinder were often lucky to achieve a 10:1 MD:CD ratio. Some carding apparatuses have reduced the MD:CD ratio within the range of 5:1 to 3:1. Carding apparatuses, such as the one depicted in FIG. 8 which comb three thinner webs from the carding cylinder and which implement appropriate control features, are capable of reducing the MD:CD ratio within the range of 3:1 to 1:1. One such carding apparatus that has implemented control features to obtain a low MD:CD ratio is manufactured by F.O.R. of Biella, Italy, a division of FIN-CARDE S.p.H. Strade Campagne, also of Biella, Italy, as model number 06803/D153C1. An additional important capability of the F.O.R. carding apparatus is that the webs combed from the carding cylinder tend to have an approximately uniform basis weight. Variation in the basis weight for each of three webs has been found to be minimal. The F.O.R. carding apparatus is thus capable of generating the different web layers in the most preferred manner, and may be modified to make the apparatus and perform the method of producing the multi-layer web product as described herein.

A benefit of the present invention is the ability to reduce production costs by converting an older carding apparatus into a carding apparatus according to the present invention. Whereas prior to the present invention, multiple carding apparatuses and other equipment, such as that previously described, were necessary to form a multi-layer web product, now a single carding apparatus may be adapted to comb two or more webs from the carding cylinder, thereby enabling a multi-layer web product to be produced from a single carding apparatus. Reducing the amount of equipment necessary to manufacture a multi-layer web product will reduce the monetary and space requirements of manufacturing multi-layer web products.

Another benefit of the present invention is that existing dry-form pulp machines, which are losing utility within the industry as stand-alone units, may be retrofitted with a single carding apparatus of the type described herein to produce web products that are desirable to consumers. Investment costs for new equipment may thus be reduced while the useful life of existing equipment may be extended, thereby providing additional cost benefits.

Thus, an apparatus and method for manufacturing multi-layer web products are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method of manufacturing a multi-layer web product comprising:
   directing a long fiber stream around a carding cylinder;
   combing a first web from the carding cylinder;
   simultaneously combing a second web from the carding cylinder;
   conveying the first and second webs toward a layering point;
   depositing short fibers onto the second web while the second web is being conveyed toward the layering point; and
   forming a layered web at the layering point by depositing the first web atop the second web with the short fibers sandwiched therebetween.

2. The method of claim 1 further comprising directing high pressure water at the layered web.

3. The method of claim 1, wherein combing the first web from the carding cylinder and conveying the first web toward the layering point include maintaining a ratio between a machine-direction strength and a cross-direction strength of the first web that is 3:1 or less.

4. The method of claim 1, wherein combing the first web from the carding cylinder and conveying the first web toward the layering point include maintaining a basis weight of the first web that is approximately consistent throughout the first web.

5. The method of claim 1, wherein combing the second web from the carding cylinder and conveying the second web toward the layering point include maintaining a ratio between a machine-direction strength and a cross-direction strength of the second web that is 3:1 or less.

6. The method of claim 1, wherein combing the second web from the carding cylinder and conveying the second web toward the layering point include maintaining a basis weight of the second web that is approximately consistent throughout the second web.

7. The method of claim 1, wherein depositing short fibers onto the second web includes depositing short fibers in the form of a paper web onto the second web.

8. A method of manufacturing a multi-layer web product comprising:

directing a long fiber stream around a carding cylinder;
combing a first web from the carding cylinder;
conveying the first web toward a layering point;
combing a second web from the carding cylinder simultaneously with combing the first web from the carding cylinder;
conveying the second web toward the layering point;
depositing short fibers onto the second web while the second web is conveyed toward the layering point;
forming a layered web at the layering point by depositing the first web atop the second web with the short fibers sandwiched therebetween; and
directing high pressure water at the layered web.

9. The method of claim 8, wherein combing the first web from the carding cylinder and conveying the first web to the layering point include maintaining a ratio between a machine-direction strength and a cross-direction strength of the first web that is 3:1 or less.

10. The method of claim 8, wherein combing the first web from the carding cylinder and conveying the first web to the layering point include maintaining a basis weight of the first web that is approximately consistent throughout the first web.

11. The method of claim 8, wherein combing the second web from the carding cylinder and conveying the second web to the layering point include maintaining a ratio between a machine-direction strength and a cross-direction strength of the second web that is 3:1 or less.

12. The method of claim 8, wherein combing the second web from the carding cylinder and conveying the second web to the layering point include maintaining a basis weight of the second web that is approximately consistent throughout the second web.

13. The method of claim 8, wherein depositing short fibers onto the second web includes depositing short fibers in the form of a paper web onto the second web.

* * * * *